(12) United States Patent
Zhao et al.

(10) Patent No.: US 8,896,269 B2
(45) Date of Patent: Nov. 25, 2014

(54) BATTERY MANAGEMENT DEVICE AND PORTABLE COMPUTER

(75) Inventors: Shuangcheng Zhao, Beijing (CN); Xiaoren Cheng, Beijing (CN); Weizhi Lin, Beijing (CN); Ling Yao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 13/142,833

(22) PCT Filed: Dec. 24, 2010

(86) PCT No.: PCT/CN2010/080231
§ 371 (c)(1),
(2), (4) Date: Jun. 29, 2011

(87) PCT Pub. No.: WO2011/079750
PCT Pub. Date: Jul. 7, 2011

(65) Prior Publication Data
US 2012/0262107 A1    Oct. 18, 2012

(30) Foreign Application Priority Data

Dec. 31, 2009   (CN) .......................... 2009 1 0244487

(51) Int. Cl.
| | |
|---|---|
| H02J 7/00 | (2006.01) |
| H02J 7/16 | (2006.01) |
| H02J 7/24 | (2006.01) |
| H02J 7/06 | (2006.01) |
| G06F 1/26 | (2006.01) |
| H01M 10/44 | (2006.01) |

(52) U.S. Cl.
CPC ...... *H01M 10/441* (2013.01); *H02J 2007/0067* (2013.01); *H02J 7/0063* (2013.01); *G06F 1/263* (2013.01)
USPC ............ 320/133; 320/155; 320/157; 320/159

(58) Field of Classification Search
USPC .................................. 320/133, 155, 157, 159
See application file for complete search history.

(56) References Cited

U.S. PATENT DOCUMENTS

| | | | | |
|---|---|---|---|---|
| 6,114,836 A | * | 9/2000 | Hagiwara et al. .............. | 320/132 |
| 7,612,536 B2 | * | 11/2009 | Hoffer et al. ................... | 320/133 |

(Continued)

FOREIGN PATENT DOCUMENTS

CN       1369927 A       9/2002
(Continued)

OTHER PUBLICATIONS

Beijing Lenovo Software Ltd.; PCT/CN2010/080231 filed Dec. 24, 2010; International Preliminary Report on Patentability; mailed Mar. 31, 2011; International Bureau of WIPO; 10 pages.

(Continued)

*Primary Examiner* — Richard V Muralidar
*Assistant Examiner* — David Henze-Gongola
(74) *Attorney, Agent, or Firm* — Dentons US LLP (57) ABSTRACT

The present invention provides a battery management device and a portable computer, the battery management device is for managing the rechargeable battery provided in a portable computer, the portable computer is provided with a charge circuit for charging a battery, the battery management device comprises: a discharge circuit for discharge the battery; a acquiring module for acquire the mode determining parameter; a first determining module for judging whether the battery storage mode is entered according to the mode determining parameter; a first control module for controlling the charge circuit or the discharge circuit to control the amount of electrical charge of the battery so that the amount of electrical charge of the battery is lower than the second amount of electrical charge threshold in the battery storage mode; the performance of the battery when deposited with the amount of electrical charge lower than the second amount of electrical charge threshold is better than the performance when deposited with the amount of electrical charge higher than the second amount of electrical charge threshold. The present invention alleviates the attenuation of the amount of electrical charge capacity of the rechargeable battery of the portable computer.

12 Claims, 2 Drawing Sheets

(56) References Cited

U.S. PATENT DOCUMENTS

| | | | |
|---|---|---|---|
| 7,629,772 B2 * | 12/2009 | Eberhard et al. | 320/150 |
| 8,256,547 B2 * | 9/2012 | Ichikawa | 180/65.29 |
| 8,258,748 B2 * | 9/2012 | Constien et al. | 320/127 |
| 2007/0029972 A1 * | 2/2007 | Lampe-Onnerud et al. | 320/132 |

FOREIGN PATENT DOCUMENTS

| | | |
|---|---|---|
| CN | 1862910 A | 11/2006 |
| CN | 102117939 | 7/2011 |
| CN | 1369927 | 8/2012 |
| JP | 2006-302567 A | 11/2006 |

OTHER PUBLICATIONS

English Translation of International Preliminary Report on Patentability in PCT/CN2010/080231.
International Preliminary Examination Report dated Jul. 4, 2012 corresponding to PCT/CN2010/080231.
English Translation of the Abstract in CN102117939.
English Translation of the Abstract in CN1369927A.
English Translation of the Abstract in CN1862910A.
English Translation of the Abstract in JP2006-302567A.

* cited by examiner

BATTERY MANAGEMENT DEVICE AND PORTABLE COMPUTER

BACKGROUND

The present invention relates to management of a rechargeable battery, and in particular, it relates to a battery management device and portal computer.

As the performance of the portable computer becomes better, there are more home users using it as a necessary electronic appliance.

The portable computer is equipped with a rechargeable battery, so that the portable computer can be used for a period without an external power supply.

However, for a commercial user, in most situations, most home users provide the portable computer with power by an external power supply at a fixed location.

For a conventional portable computer, upon power being supplied from the external power supply, the battery is taken out to preserve power. However, in this way, the portion covered by the battery, originally in the portable computer, is exposed; impurity can easily enter the inside of the portable computer through the exposed portion and cause damage to the portable computer, for example, it can cause an electrical shortage to occur.

If the battery is not taken out, a battery management method of the conventional portable computer often charges the battery in idle state, in which the state of charge of the battery is maintained at a high level (e.g., 99%), thereby such battery management method has the following defect.

The chargeable capacity of the rechargeable battery is closely related to the remaining amount of electrical charge of the battery in the idle state. Through the related experiments, it is found that the chargeable capacity of the battery is reduced by about eight percent when the fully-charged battery is stored for one year. The chargeable capacity of the battery is reduced only about four percent when the battery is 80% charged and stored for one year. If the battery is only charged to about 50%, after being stored for one year, the chargeable capacity of the battery is reduced by about one percent.

Therefore, the conventional battery management methods maintain the amount of electrical charge of the battery at a high level, which causes the chargeable capacity of the battery to attenuate.

SUMMARY

One embodiment of the invention is to provide a battery management device and a portable computer that alleviate the attenuation of a rechargeable battery in the portable computer.

In order to achieve the above objective, the embodiments of the present invention provide a battery management device for managing a rechargeable battery provided in a portable computer. The portable computer is provided with a charge circuit for charging the battery, where the battery management device comprises a discharge circuit for discharging the battery; an acquiring module for acquiring the mode judge parameter; a first determining module for determining whether a battery storage mode is entered, according to the mode determining parameter; a first control module for controlling the charge circuit or the discharge circuit to control an amount of electrical charge of the battery in the battery storage mode, so that the amount of electrical charge of the battery is lower than a second amount of electrical charge threshold; and the performance of the battery, when the battery is stored with an amount of electrical charge lower than the second amount of electrical charge threshold, is better than the performance when stored with the amount of electrical charge higher than the second amount of electrical charge threshold.

In the battery management device, the mode determining parameter represents the state of charge of the battery, the first determining module is used to determine that the battery storage mode is entered during the period in which the amount of electrical charge of the battery is higher than a first amount of electrical charge threshold that exceeds a first time threshold, and the second amount of electrical charge threshold is less than the first amount of electrical charge threshold.

In the battery management device, the mode determining parameter represents the state of charge of the battery, a movement parameter, and a usage state of an external power supply. The first determining module is used to determine that the battery storage mode is entered during the period in which the state of charge of the battery is higher than a first amount of electrical charge threshold that exceeds a first time threshold, the period during which the movement parameter is less than a movement parameter threshold that exceeds a second time threshold and the portable computer current use of the external power supply, and the second amount of electrical charge threshold is less than the first amount of electrical charge threshold.

The above battery management device further comprises a second control module for controlling the charge circuit or the discharge circuit to control the amount of electrical charge of the battery so that the amount of electrical charge of the battery is higher than a third amount of electrical charge threshold in the battery storage mode; and a third amount of electrical charge threshold is less than the second amount of electrical charge threshold.

The battery management device further comprises a third control module for controlling the charge circuit to enter a normal charge mode when the amount of electrical charge of the battery is less than a fourth amount of electrical charge threshold in the battery storage mode, and the fourth amount of electrical charge threshold is less than the third amount of electrical charge threshold.

In the battery management device, the performance is measured by the chargeable capacity of the battery or the safety amount of electrical charge of the battery.

In the battery management device, the battery management device is implemented by using the embedded chip EC of the portable computer.

One embodiment of the present invention further provides a portable computer comprising a main board, a rechargeable battery connected with the main board, and a charge circuit for charging the battery. The portable computer further comprises a battery management device. The battery management device comprises a discharge circuit for discharging the battery; an acquiring module for acquiring the mode determining parameter; a first determining module for judging whether the battery storage mode is entered, according to the mode determining parameter; a first control module for controlling the charge circuit or the discharge circuit to control an amount of electrical charge of the battery in the battery storage mode, so that the amount of electrical charge of the battery is lower than a second amount of electrical charge threshold; and the performance of the battery when stored with an amount of electrical charge lower than the second amount of electrical charge threshold is better than the performance when the battery is stored with an amount of electrical charge higher than the second amount of electrical charge threshold.

In the portable computer, the mode determining parameter represents the amount of electrical charge of the battery. The first determining module is used to determine that the battery storage mode is entered during the period in which the amount of electrical charge of the battery is higher than a first amount of electrical charge threshold that exceeds a first time threshold.

In the above battery management device, the mode determining parameter represents the amount of electrical charge of the battery, a movement parameter, and a usage state of an external power supply. The first determining module is used to determine that the battery storage mode is entered during the period in which the amount of electrical charge of the battery is higher than a first amount of electrical charge threshold that exceeds a first time threshold, the period during which the movement parameter is less than a movement parameter threshold that exceeds a second time threshold and the portable computer currently uses of the external power supply.

In the above portable computer, the battery management device further comprises the second control module for controlling the charge circuit or the discharge circuit to control the amount of electrical charge of the battery, so that the amount of electrical charge of the battery is higher than a third amount of electrical charge threshold in the battery storage mode; and a third amount of electrical charge threshold is less than the second amount of electrical charge threshold.

In the portable computer, the battery management device further comprises a third control module for controlling the charge circuit to enter a normal charge mode when the amount of electrical charge of the battery is less than a fourth amount of electrical charge threshold in the battery storage mode, and the fourth amount of electrical charge threshold is less than the third amount of electrical charge threshold.

In the portable computer, the performance is measured by the chargeable capacity of the battery or the safety amount of electrical charge of the battery.

In the portable computer, the battery management device is implemented by using the embedded chip EC of the portable computer.

Some embodiments of the present invention have the following advantageous effect:

In the embodiment of the present invention, dictating the charge circuit or the discharge circuit to control the amount of electrical charge of the battery causes the amount of electrical charge in the battery to be less than the second amount of electrical charge threshold in the battery storage mode; the performance of the battery, when the battery is stored with an amount of electrical charge lower than the second amount of electrical charge threshold, is better than the performance when the battery is stored with an amount of electrical charge higher than the second amount of electrical charge threshold. Thus, the attenuation of the chargeable capacity of the rechargeable battery in the portable computer is alleviated.

In one embodiment of the present invention, dictating the charge circuit or the discharge circuit to control the amount of electrical charge of the battery causes the amount of electrical charge of the battery to be less than the third amount of electrical charge threshold in the battery storage mode, and the third amount of electrical charge threshold to be less than the second amount of electrical charge threshold. Thus, it ensures that the attenuation of the chargeable capacity of the rechargeable battery of the portable computer is alleviated, while it ensures that the phenomenon of over discharge of the battery does not occur, and it ensures that it can be used for a period after the AC power supply is turned off.

In one embodiment of the present invention, if the state of charge of the battery is lower than the fourth amount of electrical charge threshold, the charge circuit is controlled to enter the normal charge state in the battery storage mode. The fourth amount of electrical charge threshold is less than the third amount of electrical charge threshold, therefore, an in-time switching of the state of the battery is ensured.

DETAILED DESCRIPTION

In one embodiment of the present invention, determining whether the battery storage mode is entered by the mode determining parameter, and in the battery storage mode, the remaining amount of electrical charge of the battery is controlled to be lower than a certain level to alleviate the attenuation of the chargeable capacity of the rechargeable battery in the portable computer.

Figure 1:
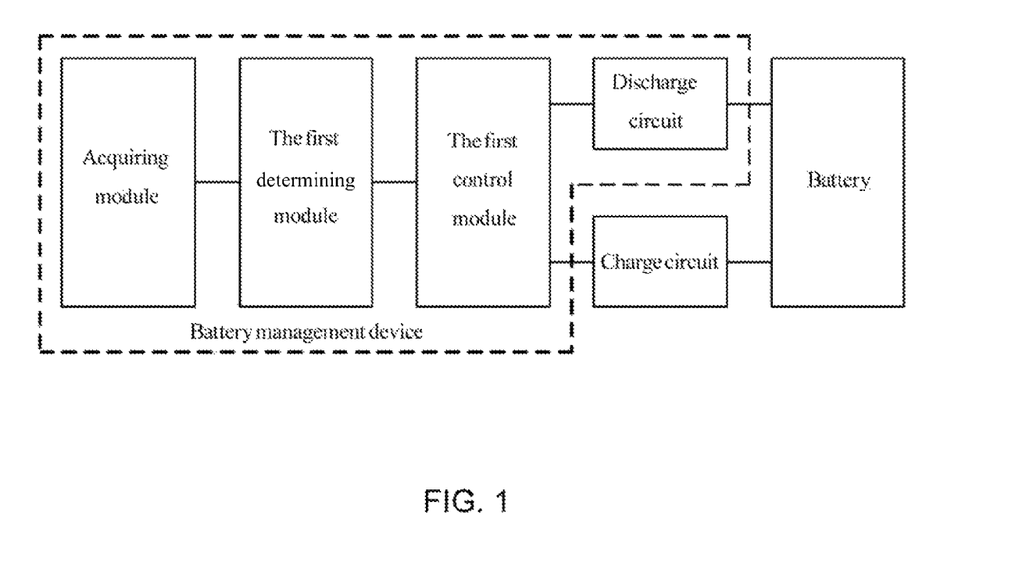
FIG. 1 is a system diagram illustrating the portable computer in accordance with one embodiment of the present invention.

The portable computer, in one embodiment of the present invention, comprises a main board, a rechargeable battery connected with the main board, and a charge circuit for charging the battery. The portable computer further comprises a battery management device, as shown in FIG. 1, the battery management device comprises a discharge circuit for discharging the battery; an acquiring module for acquiring the mode determining parameter; a first determining module for judging whether the battery storage mode is entered, according to the mode determining parameter; a first control module for controlling the charge circuit or the discharge circuit to control an amount of electrical charge of the battery in the battery storage mode, so that the amount of electrical charge of the battery is lower than a second amount of electrical charge threshold; and the performance of the battery, when stored with an amount of electrical charge lower than a second amount of electrical charge threshold, is better than the performance when the battery is stored with an amount of electrical charge that is higher than the second amount of electrical charge threshold.

In one embodiment of the present invention, whether the battery storage mode is entered can be determined by various ways. Determining whether the battery storage mode is entered is based on a prediction, which forecasts the situation in a future period according to the situation in a past period.

The First Implementation

In a first implementation, the mode determining parameter represents the amount of electrical charge in the battery. The first determining module determines entering the battery storage mode during the period in which the amount of electrical charge of the battery is higher than a first amount of electrical charge threshold that exceeds a first time threshold.

The first implementation will be further explained detailed as follows.

If the user uses an AC power supply to provide power support to the portable electronic apparatus in the past, and the battery is currently in an idle state, as described in the background, the portable electronic apparatus often charges the battery in the idle state while maintaining the amount of electrical charge of the battery at a high level, (e.g., 99% of a maximum amount of electric charge). Therefore, in the first implementation, whether the user uses the AC power supply to provide the power support to the portable electronic apparatus in the future is predicted on the period during which the amount of electrical charge of the battery is higher than the first amount of electrical charge threshold.

The amount of electrical charge in the battery is detected by setting a detecting module, which can detect periodically, e.g., every 15 minutes. The detecting period can also be defined by a user.

With the detection result of the detecting module, if it is found that the amount of electrical charge in the battery is maintained at a high level, e.g., higher than the 70%, 80%, or even 90% of the maximum amount of electrical charge in the battery, the period of this situation that exceeds a first time threshold can be set longer (e.g., 72 hours).

In this situation, it indicates that the user has used the AC power supply to provide the power support to the portable electronic apparatus for the past three days, and it can be predicted that the user may use the AC power supply to provide the power support to the portable electronic apparatus in the future. In such situation, if the conventional battery management method is followed continuously, the amount of electrical charge in the battery is maintained at a very high level, and it may cause an increase in attenuation of the chargeable capacity of the rechargeable battery of the portable computer.

In order to prevent this situation from occurring, the battery storage mode is entered during the period in which the amount of electrical charge in the battery is higher than the first amount of electrical charge threshold that exceeds the first time threshold. In the battery storage mode, dictating the charge circuit or the discharge circuit to control the amount of electrical charge in the battery causes the amount of electrical charge of the battery to be lower than the second amount of electrical charge threshold; the performance of the battery, when the battery is stored with an amount of electrical charge lower than the second amount of electrical charge threshold, is better than the performance, when the battery is stored with an amount of electrical charge that is higher than the second amount of electrical charge threshold.

The Second Implementation

In the second implementation, the mode determining parameter represents the amount of electrical charge in the battery and a usage state of an external power supply. The first determining module is used to determine that the battery storage mode is entered during the period in which the amount of electrical charge of the battery is higher than a first the amount of electrical charge threshold that exceeds a first time threshold and the portable computer that currently uses the external power supply.

The second implementation is further explained in detailed as follows.

Similar to the first implementation, if the user uses the AC power supply to provide the power support to the portable electronic apparatus in the past, the battery is currently in an idle state, but the amount of electrical charge of the battery is maintained at a high level (e.g., 99% of a maximum amount of electrical charge).

In the second implementation, if the user uses the AC power supply to provide the power support to the portable electronic apparatus for the past three days, it can be predicted that the user uses the AC power supply to provide the power support to the portable electronic apparatus in the future. In this situation, as in the first implementation, the battery storage mode is entered directly, and dictating the charge circuit or the discharge circuit to control the amount of electrical charge of the battery causes the amount of electrical charge of the battery to be lower than the second amount of electrical charge threshold.

The second implementation is different from the first implementation. If the user has used the AC power supply to provide the power support to the portable electronic apparatus for the past three days, it is also necessary to determine whether the portable computer currently uses the external power supply.

It is assumed that the user has used the AC power supply to provide the power support to the portable computer for the past three days, and it is assumed that the user does not use the AC power supply to provide the power support to the portable electronic apparatus currently. At this time, the user may need to use the portable computer without the external power supply for a period. At such time, the battery is discharged, and it may cause a reduction of the usable time in the battery.

Therefore, in the second implementation, not only the condition that the user has used the AC power supply to provide the power support to the portable computer for the past three days needs to be satisfied, but also, the condition that the portable computer currently uses the external power supply needs to be satisfied. It is determined that the battery storage mode is entered when both conditions are satisfied, and dictating the charge circuit or the discharge circuit to control the amount of electrical charge of the battery causes the amount of electrical charge of the battery to be lower than the second amount of electrical charge threshold.

Compared to the first implementation, the condition for entering into the battery storage mode ensures further advancement.

The Third Implementation

In the third implementation, the mode determining parameter represents the amount of electrical charge in the battery, movement parameter, and a usage state of an external power supply. The first determining module is used to determine that the battery storage mode is entered during the period in which the amount of electrical charge of the battery is higher than a first the amount of electrical charge threshold that exceeds a first time threshold, the period during which the movement parameter is less than a movement parameter threshold that exceeds a second time threshold, and the portable computer that currently uses the external power supply.

The third implementation is further explained in detailed as follows.

Similar to the first implementation, if the user uses the AC power supply to provide the power support to the portable electronic apparatus in the past, the battery is currently in an idle state, and the amount of electrical charge of the battery is maintained at a high level (e.g., 99% of a maximum amount of electrical charge).

In the third implementation, if the user has used the AC power supply to provide the power support to the portable electronic apparatus for the past three days, it can be predicted that the user uses the AC power supply to provide the power support to the portable electronic apparatus in the future. In this situation, as in the first implementation, the battery storage mode is entered directly, and dictating the charge circuit or the discharge circuit to control the amount of electrical charge of the battery causes the amount of electrical charge of the battery to be lower than the second amount of electrical charge threshold.

The third implementation is different from the first implementation. If the user has used the AC power supply to provide the power support to the portable electronic apparatus for the past three days, it is also necessary to determine whether the following condition are satisfied.

The period during which the movement parameter is less than a movement parameter threshold exceeds a second time threshold, and the portable computer that currently uses the external power supply.

The period during which the movement parameter is less than the movement parameter threshold exceeding the second time threshold indicates that the user does not have an intention to move the portable electronic apparatus, and the portable computer currently using the external power supply indicates that the intention of using the external power supply of the user.

Assume that the user has used the AC power supply to provide the power support to the portable computer for the past three days, but the user is in a moving state at this time. For example, the user moves the portable computer to another location, and if the battery storage mode is entered at this time, the battery would be discharged to the second amount of electrical charge threshold, which would not be desirable. An example is provided follows.

Assume that the user is in the process of carrying the portable computer between work and home, and the portable computer is not turned off. Since the power of the portable computer is supplied using the AC power supply previously, if the battery storage mode is entered when the condition of the period in which the amount of electrical charge of the battery is higher than the amount of electrical charge threshold that exceeds the first time threshold is satisfied, and the battery is discharged, since the user is in the midst of going home, and the portable computer is not turned off (e.g., using the in-car power supply). If the battery is discharged, the remaining amount of electrical charge is insufficient without the in-car power supply. This may cause the computer to be turned off abnormally due to exhausting the amount of electrical charge in the battery before the user arrives at home, where the user could begin to use the AC power supply. Such occurrence may damage the portable computer.

Assume that the user currently does not use the AC power supply to provide the power support to the portable electronic apparatus, the user may need to use the portable computer for a period without the external power supply where the discharging may also cause the reduction of the usable time of the battery.

Here, for example, a location device such as GPS module can be set in the portable computer, and the movement parameter is generated based on the location of the portable computer at a different time, as obtained by the GPS module. Further, a movement sensor (e.g., acceleration sensor and gyro, etc.) can be set in the portable computer to generate the movement parameter.

Therefore, in the third implementation, not only the condition that the user has used the AC power supply to provide the power support to the portable computer for the past three days needs to be satisfied, the two conditions that the period during which the movement parameter is less than the movement parameter threshold that exceeds the second time threshold, and the portable computer currently using the external power supply also need to be satisfied. It is determined that the battery storage mode is entered when all of the three condition are satisfied, and dictating the charge circuit or the discharge circuit to control the amount of electrical charge of the battery thereby causing the amount of electrical charge in the battery to be lower than the second amount of electrical charge threshold.

Compared to the first implementation, the condition for entering into the battery storage mode is further ensured to be stricter, and the determination to enter into the battery storage mode is further ensured to be more accurate.

Three determining (or judging) methods for determining (or judging) whether the battery storage mode is entered are described above. Other means of determination are also possible as described in the following example.

If the proportional amount of time that the user uses the AC power supply to provide the power support to the portable electronic apparatus is higher than a preset threshold (e.g., 98%) in a power-on-state in a past period; or If the proportional amount of time that the user uses the battery to provide the power support to the portable electronic apparatus is lower than a preset threshold (e.g., 2%) in the power-on-state in a past period.

Other trivial details in the above means will not be exemplified here.

In one embodiment of the present invention, dictating the charge circuit or the discharge circuit to control the amount of electrical charge in the battery causes the amount of electrical charge of the battery to be lower than the second amount of electrical charge threshold in the battery storage mode;

During the selection of the second amount of electrical charge, the user's requirements can also be considered, since the mobility of the portable computer needs to be considered, therefore, the second amount of electrical charge threshold can be considered to set to 50% of the capacity of electric charge (or the maximum amount of electric charge) of the battery.

The performance of the battery when being stored with an amount of electrical charge lower than the second amount of electrical charge threshold is better than the performance when being stored with an amount of electrical charge higher than the second amount of electrical charge threshold. A certain remaining amount of electrical charge of the battery needs to be ensured. Therefore, in the embodiment of the present invention, the battery management device further comprises:

A second control module for controlling the charge circuit or the discharge circuit to control the amount of electrical charge in the battery so that the amount of electrical charge of the battery is higher than a third amount of electrical charge threshold in the battery storage mode;

The third amount of electrical charge threshold is less than the second amount of electrical charge threshold.

In one embodiment of the present invention, the second amount of electrical charge threshold can be selected at 50% of the capacity in the battery, and the third amount of electrical charge threshold can be selected at 45% of the capacity of the battery.

The second amount of electrical charge threshold and the third amount of electrical charge threshold can be set according to the power consumption performance of the portable computer. If the power consumption performance of the portable computer is poor, the second and third amounts of electrical charge are set higher. If the power consumption performance of the portable computer is excellent, the second and third amounts of electrical charge are set lower.

The setting of the second control module, in one embodiment of the present invention, is directed to ensure that the battery does not over discharge.

One embodiment of the present invention further comprises the following:

A third control module for controlling the charge circuit to perform a normal charge control to the battery when the amount of electrical charge of the battery is lower than a fourth amount of electrical charge threshold in the battery storage mode. The fourth amount of electrical charge threshold is less than the third amount of electrical charge threshold;

When the amount of electrical charge of the battery is lower than the fourth amount of electrical charge threshold, it is indicated that there is no external power supply at this time, since the battery is normally discharged or the battery provides power support to the portable computer. The amount of power is reduced continuously, and at this time, the charge circuit should be controlled to enter a normal charge mode, which ensures the normal usage of the user.

The above situation is elaborated as follows.

Assuming the amount of electrical charge of the battery is maintained between 45% and 50% for a longer time in the battery storage mode, and on a certain day, the user pulls off the AC power supply, or the power supply is turned off, the battery then discharges slowly (in a power-off state) or discharge continuously (in a power-on state), thereby rendering the remaining amount of electrical charge to be lower than 30% of the capacity in the battery. Any of these situations indicates that the portable computer does not have the support of the AC power supply at this time, and in this case, the charge circuit should be controlled to enter the normal charge mode. Once the user connects the AC power supply, the charge circuit charges the battery with the AC power supply.

In one embodiment of the present invention, the performance is the chargeable capacity of the battery or the safety amount of electrical charge of the battery.

The battery management device is implemented by using the embedded chip EC of the portable computer.

Figure 2:
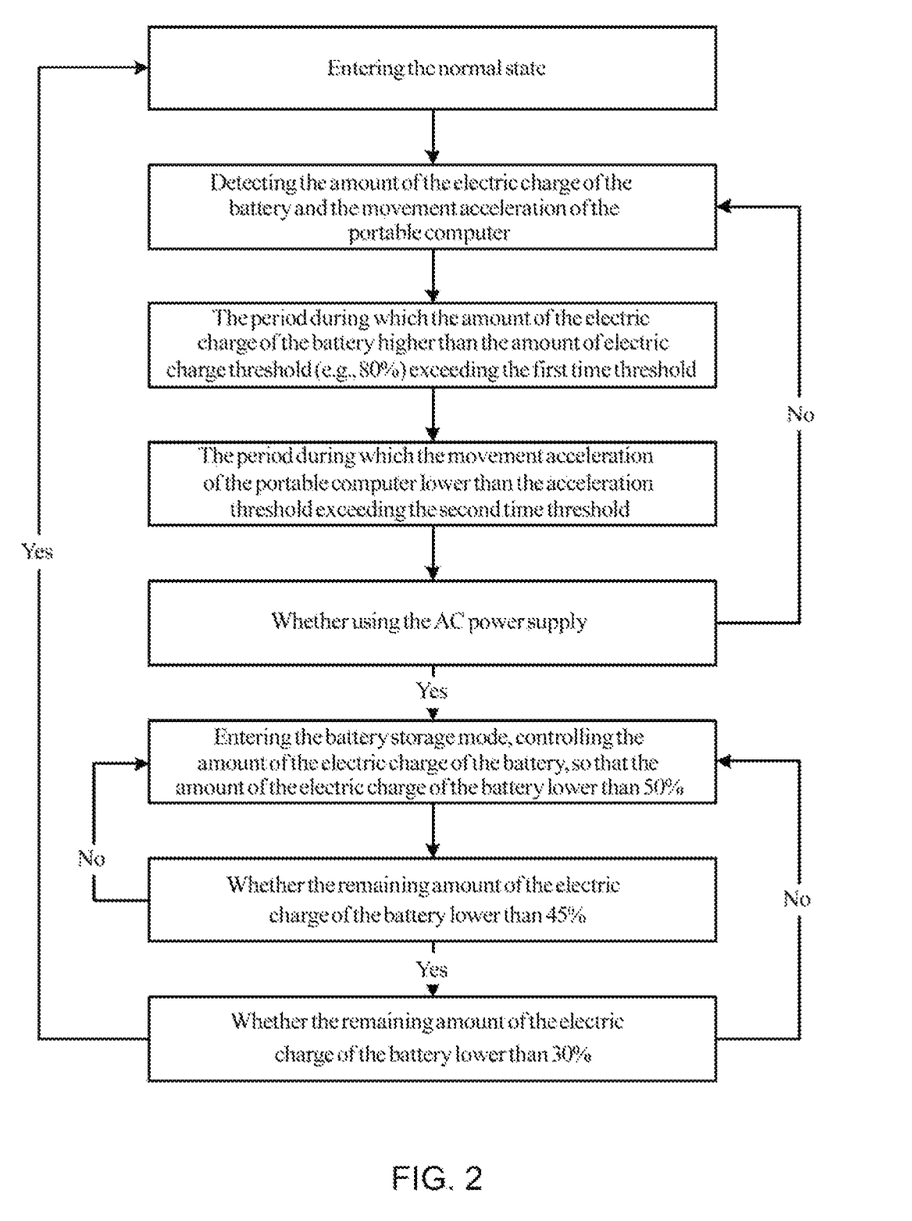
FIG. 2 is a flow diagram illustrating the operational process of the portable computer in accordance with one embodiment of the present invention.

The operational procedure of the device, in one embodiment of the present invention, is explained in detailed with respect to the above third implementation, as shown in FIG. 2, which comprises as follow:

Step 21, the normal state is entered.

Step 22, the battery management device detects the amount of electrical charge in the battery, and the movement acceleration of the portable computer.

Step 23, the battery management device determines the period during which the amount of electrical charge of the battery is higher than the first amount of electrical charge threshold (e.g., 80%) that exceeds the first time threshold (e.g., 72 hours), according to the detection result in the past (e.g., 72 hours); if this condition occurs, it proceeds to step 24, otherwise, it returns to step 23.

For example, it detects by an increment of every five minutes. If the amount of electrical charge in the battery is higher than 80% of the capacity in the battery, the result is recorded as "1"; otherwise, the result is recorded as "0." At this time, the battery management device determines whether there is one or more "0" in the past 12*72 detection results, and if "0" appears, the determination result is affirmative; otherwise, the determination result is negative.

Step 24, the battery management device determines the period during which the movement acceleration of the portable computer is lower than the acceleration threshold that exceeds the second time threshold (e.g., 1 hour), according to the detection result in the past period (e.g., 1 hour); if this condition is met, it proceeds to step 25; otherwise, it returns to step 23.

Step 25, the battery management device determines whether the portable computer currently uses the AC power supply; if it is, it proceeds to step 26; otherwise, it returns to step 23.

Step 26, the battery storage mode is entered. Dictating the charge circuit or the discharge circuit to control the amount of electrical charge causes the amount of electrical charge of the battery to be lower than 50%.

Step 27, the battery management device determines whether the remaining amount of electrical charge of the battery is lower than 45%; if this condition is met, it proceeds to step 28; otherwise, it returns to step 27.

Step 28, the battery management device determines whether the remaining amount of electrical charge of the battery is lower than 30%; if this condition is met, it proceeds to step 21; otherwise, it returns to step 26.

In the embodiments of the invention, it will be obvious that the same may vary in many ways. Such variations are not to be regarded as a departure from the spirit and scope of the invention, and all such modifications are obvious to those skilled in the art and are intended to be included within the scope of the following claims.

What is claimed is:

1. A battery management device for managing a rechargeable battery in a portable computer, the portable computer having a charge circuit for charging the rechargeable battery, the battery management device comprises:

a discharge circuit for discharging the rechargeable battery;

an acquiring module configured to acquire a mode determining parameter;

a first determining module configured to determine whether a battery storage mode is entered according to the mode determining parameter;

a first control module configured to control the charge circuit or the discharge circuit, thereby controlling the amount of electrical charge in the rechargeable battery that is in the battery storage mode such that the amount of electrical charge in the rechargeable battery is lower than a second amount of electrical charge threshold, wherein the performance of the rechargeable battery when being stored with an amount of electrical charge that is lower than the second amount of electrical charge threshold is better relative to the performance when being stored with an amount of electrical charge that is higher than the second amount of electrical charge threshold;

wherein the mode determining parameter comprises the amount of electrical charge in the rechargeable battery and a current usage state of an external power supply, the first determining module configured to determine that the battery storage mode is entered when the period during which the amount of electrical charge of the battery is higher than a first amount of electrical charge threshold that exceeds a first time threshold and meanwhile the portable computer currently uses the external power supply, and determine that the battery storage mode is not entered when the period during which the amount of electric charge of the battery is higher than the first amount of electric charge threshold exceeds a first time threshold and the portable computer does not currently use the external power supply, the second amount of electrical charge threshold that is less than the first amount of electrical charge threshold;

wherein the current usage state of the external power supply is an actual current usage state of the external power supply and is not predicted.

2. The battery management device of claim 1, wherein the mode determining parameter further comprises a movement parameter, the first determining module configured to determine whether the battery storage mode is entered when the period during which the amount of electrical charge of the battery is higher than the first amount of electrical charge threshold that exceeds the first time threshold, the period during which the movement parameter that is less than the movement parameter threshold exceeds a second time threshold and the portable computer currently uses the external power supply, the second amount of electrical charge threshold that is less than the first amount of electrical charge threshold;
    wherein if the period during which the movement parameter is less than the movement parameter threshold does not exceed the second time threshold and the portable computer is moved, the battery storage mode is not entered.

3. The battery management device of claim 1, further comprising:
    a second control module configured to control the charge circuit or the discharge circuit to control the amount of electrical charge of the battery so that the amount of electrical charge of the battery is higher than a third amount of electrical charge threshold in the battery storage mode;
    wherein the third amount of electrical charge threshold being less than the second amount of electrical charge threshold.

4. The battery management device of claim 2, further comprising a third control module configured to control the charge circuit to enter a normal charge mode when the amount of electrical charge of the battery is less than a fourth amount of electrical charge threshold in the battery storage mode, wherein the fourth amount of electrical charge threshold being less than the third amount of electrical charge threshold.

5. The battery management device of claim 1, wherein the performance is measured by the chargeable capacity of the battery or the safety amount of electrical charge of the battery.

6. The battery management device of claim 1, wherein the battery management device is implemented using an embedded chip EC of the portable computer.

7. A portable computer having a main board, a rechargeable battery connected with the main board and a charge circuit for charging the battery, and a battery management device, the battery management device comprises:
    a discharge circuit for discharging the battery;
    an acquiring module configured to acquire a mode determining parameter;
    a first determining module configured to determine whether a battery storage mode is entered according to the mode determining parameter;
    a first control module configured to control the charge circuit or the discharge circuit to control an amount of electrical charge of the battery in the battery storage mode such that the amount of electrical charge of the battery is lower than a second amount of electrical charge threshold;
    the performance of the battery when being stored with an amount of electrical charge is lower than the second amount of electrical charge threshold that is better relative to the performance when being stored with an amount of electrical charge higher than the second amount of electrical charge threshold;
    wherein the mode determining parameter comprises the amount of electrical charge of the battery and a current usage state of an external power supply, the first determining module configured to determine whether the battery storage mode is entered when the period during which the amount of electrical charge of the battery is higher than a first amount of electrical charge threshold exceeds a first time threshold and meanwhile the portable computer currently uses the external power supply, and determine that the battery storage mode is not entered when the period during which the amount of electric charge of the battery is higher than the first amount of electric charge threshold exceeds a first time threshold and the portable computer does not currently use the external power supply, the second amount of electric charge threshold is less than the first amount of electric charge threshold;
    wherein the current usage state of the external power supply is an actual current usage state of the external power supply and is not predicted.

8. The portable computer of claim 7, wherein the mode determining parameter further comprises a movement parameter, the first determining module determining whether the battery storage mode is entered when the period during which the amount of electrical charge of the battery is higher than a first amount of electrical charge threshold that exceeds a first time threshold, the period during which the movement parameter being less than a movement parameter threshold that exceeds a second time threshold and the portable computer currently uses the external power supply;
    wherein if the period during which the movement parameter is less than the movement parameter threshold does not exceed the second time threshold and the portable computer is moved, the battery storage mode is not entered.

9. The portable computer of claim 7, wherein the battery management device further comprises a second control module configured to control the charge circuit or the discharge circuit to control the amount of electrical charge of the battery so that the amount of electrical charge of the battery is higher than a third amount of electrical charge threshold in the battery storage mode;
    wherein the third amount of electrical charge threshold being less than the second amount of electrical charge threshold.

10. The portable computer of claim 9, wherein the battery management device further comprises:
    a third control configured to control the charge circuit to enter a normal charge mode when the amount of electrical charge of the battery is less than a fourth amount of electrical charge threshold in the battery storage mode;
    wherein the fourth amount of electrical charge threshold being less than the third amount of electrical charge threshold.

11. The portable computer of claim 7, wherein the performance is measured by the chargeable capacity of the battery or the safety amount of electrical charge of the battery.

12. The portable computer of claim 7, wherein the battery management device is implemented using an embedded chip EC of the portable computer.

* * * * *

UNITED STATES PATENT AND TRADEMARK OFFICE
CERTIFICATE OF CORRECTION

| | | |
|---|---|---|
| PATENT NO. | : 8,896,269 B2 | Page 1 of 1 |
| APPLICATION NO. | : 13/142833 | |
| DATED | : November 25, 2014 | |
| INVENTOR(S) | : Zhao et al. | |

It is certified that error appears in the above-identified patent and that said Letters Patent is hereby corrected as shown below:

On the Title Page, Item [30] the Foreign Priority Application Delete "(CN) 200910244487" and insert --(CN) 200910244487.7--

Signed and Sealed this
Twenty-fourth Day of March, 2015

Michelle K. Lee
*Director of the United States Patent and Trademark Office*